Reissued Jan. 3, 1939

Re. 20,968

UNITED STATES PATENT OFFICE 20,968

TREATMENT OF HYDROCARBONS WITH SULPHUR DIOXIDE AND CHLORINE

Cortes F. Reed, Anoka, Minn., assignor of one-half to Charles L. Horn, Minneapolis, Minn.

No Drawing. Original No. 2,046,090, dated June 30, 1936, Serial No. 704,591, December 29, 1933. Application for reissue May 5, 1938, Serial No. 206,274

29 Claims. (Cl. 260—400)

This invention relates to a novel and improved method of forming substitution products from cyclic or acyclic compounds and to the new products resulting therefrom.

The primary object of the present invention is to provide a novel and improved method of forming halogen-containing products either of the aliphatic or aromatic series which shall permit substitution of varying degrees, that is, one or a multiplicity of hydrogen atoms may be replaced by a similar number of substituted groupings and/or halogen atoms.

A further object is to provide new products consisting of compounds of the open or closed chain series wherein some of the hydrogen atoms have been replaced by halogen atoms and at least one of the hydrogen atoms has been replaced by a group containing oxygen, sulphur and chlorine, and wherein these new products may be readily hydrolyzed or saponified and are capable of reacting with other chemical compounds.

A still further object is to provide a novel and improved method of forming substitution products of this general character which shall be inexpensive to carry out, easy to control, and wherein any tendency of the compound being substituted to polymerize may be easily avoided.

The foregoing and other objects and advantages will become more apparent as the description proceeds, and will be pointed out in the appended claims.

In carrying out my invention, the compound to be substituted, if a gas or liquid, needs no further preparation other than the application of heat to start the reaction when necessary, or the use of a diluent, or chilling when the reaction at the start is too fast. In the case of solids, these may be liquefied either by heat, if possible, without disturbing their chemical structure, or by the use of a solvent, or both.

I have discovered that when compounds of either the aliphatic or aromatic series are treated with a mixture of sulphur dioxide and one of the halogens in the gaseous form, as for example chlorine, by bubbling these two gases through one of the aforementioned compounds a substitution is effected upon the hydrocarbon by replacement of one or more hydrogen atoms of the hydrocarbon and the formation of hydrogen chloride. Continued bubbling of these two gases through the compound appears to effect further substitution by means of the replacement of additional hydrogen atoms as aforesaid. The substituent group or groups may be chlorine and/or a group containing oxygen, sulphur and chlorine.

I find it highly desirable, however, to stop the reaction before the hydrocarbon is completely substituted as this product does not appear to hydrolyze or saponify as readily as when the reaction is stopped at an earlier stage.

The substituent group containing oxygen, sulphur and chlorine is relatively unstable and is preferably formed in the absence of water. This group is readily hydrolyzed or saponified, and when formed on compounds of the shorter chain hydrocarbons, it is quite unstable to water, particularly at somewhat elevated temperatures. On the longer chain hydrocarbons there is a lessening of action as the number of carbon atoms increases. Thus, for example, hydrocarbon products containing as many as twenty-four carbon atoms react very slowly in boiling water but readily with a weak alkaline solution. During the stage of hydrolysis, the substituent group containing oxygen, sulphur and chlorine is modified in such manner that the reaction product becomes partially if not wholly, soluble, a condition extremely favorable for the removal of the substituted chlorine atoms.

As the chlorine atom or atoms are removed the product becomes water soluble, the degree of solubility depending in part upon the ratio of the size of the molecule and the number of chlorine atoms which have been removed.

During the reaction of the hydrocarbon with sulphur dioxide and chlorine, I find that it is important to control the temperature of the reaction so that undesirable reactions accompanied by discoloration do not occur. This is particularly true with compounds of the aliphatic series, and as a specific example, the treatment of paraffin will be used.

Paraffin was heated to 90–95° C. to liquefy the same and chlorine and sulphur dioxide gases were bubbled through the liquid. After a gain in weight of 20–25%, the temperature was reduced to between 40 and 50° C. for the remainder of the treatment. By controlling the temperature of reaction, polymerization of the paraffin was avoided. Experiments have shown that if the temperature is not controlled, this treatment of the paraffin is accompanied by rise in temperature, due to the exothermic reaction, which causes the product to assume a dark color, possibly indicating polymerization, and the resulting product, although a substituted paraffin, is not the same product from the standpoint of chemical structure, as the product produced by temperature control.

The substituted paraffin produced by temperature control is a moderately viscous oil, light yellow in color, and liquid, at room temperature. This product, from all indications, where $C_{24}H_{50}$ is representative of paraffin wax, appears to contain molecules which have substituted therein one or more sulphur containing groups and/or one or more chlorine atoms. The number of sulphur containing groups and/or chlorine atoms which are substituted therein is, of course, dependent upon the length of time the paraffin is treated and it will be understood that more or less substitutions could be made varying from one to the complete substitution product.

I prefer, however, to stop this treatment short of complete substitution as I find that the products produced in this manner are readily hydrolyzed or saponified. As pointed out above, the presence of the group containing oxygen, sulphur and chlorine on the shorter chain hydrocarbons renders the product quite unstable in the presence of water particularly at somewhat elevated temperatures, while on the longer chain hydrocarbons there is a lessening of action as the number of carbon atoms increases. With hydrocarbons containing as many as twenty-four carbon atoms, the reactive tendency has slowed down until the chlorinated product is only slowly hydrolyzed in boiling water but more readily hydrolyzed with a weak alkaline solution.

When the substituted paraffin has been hydrolyzed it becomes water soluble. This is also true of any of the aliphatic compounds which have been substituted by my improved method. These hydrolyzed products are soluble in water, ether, alcohol, acids, benzene, carbon tetrachloride, carbon bisulphide, petroleum products and various fats and oils. Due to their wide range of solubility, they are very useful in forming emulsions of normally incompatible substances, for example, paraffin, asphalt, gasoline, or any of the petroleum hydrocarbons and water, any of the vegetable oils or glycerides and water, or ether, carbon tetrachloride, carbon bisulphide, etc. and water. For the above reasons also they are very useful as detergents, and possessing great wetting power they are useful in the textile, leather, paper manufacturing and other industries.

By careful control of the process, the reaction may be kept to a state such that the end product is substituted with a single group containing oxygen, sulphur and chlorine. Through small amounts of moisture admitted, or hydrolysis by means of a weak alkaline solution, the aforesaid sulphur containing substituent may be modified. For example, by boiling in neutral or slightly alkaline solution, the aforesaid sulphur containing substituent may be modified to form the true sulphonic group:

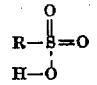

There is some contamination of the end products, for example, there may be some of the original chlorine substituted products with the end products produced by hydrolysis. A slight contamination of the various products is of no material consequence, however, as far as their technical uses are concerned. If desired, they can be separated from one another.

From the above, it is apparent that with the aliphatic hydrocarbons, it is possible by my method to form directly halogen substitutions, sulphur containing compounds, and a mixture of halogen substitutions and sulphur containing compounds.

From the halogen substitutions, sulphur containing compounds, and the mixture of halogen substitutions and sulphur containing compounds, the following compounds may be readily formed:—other sulphur containing compounds such as aliphatic sulphonic acids, hydroxy compounds or a combination thereof in a single hydrocarbon compound.

There is apparently no limit in the size of the molecules which will react in accordance with my method provided they are kept in a fluid condition at the temperature of the reaction. With the higher melting substances, an inert solvent may be used to obtain this condition.

Those products produced in accordance with this invention which contain a sulphonic acid group and/or a hydroxyl group, as pointed out above, are water soluble and are useful as solvents or detergents. They also have antiseptic properties and may also be used as insecticides. Being water soluble they may be applied in almost any desired strength.

In treating fatty acids by my method, it is not necessary to separate them from the glycerine as the whole may be subjected to the two gases, the various subsequent steps of processing carried out, and the glycerine removed, if at all, whenever it is most convenient.

I find that my method of producing substitution products is also applicable to animal or vegetable fats or oils and to mineral hydrocarbons and to those of the aromatic series.

As an example of halogenating aromatic hydrocarbons, chlorine and sulphur dioxide were passed into benzene ($C_6H_6$) at room temperature, the ratio of the gases being two for the chlorine and one for the sulphur dioxide by volume. Approximately one-half hour after starting the gas flow, the product of the reaction reached the saturation point in the mother liquid and began to crystallize out in the bottom of the containing vessel. The product was separated from the mother liquid by decantation, filtration or wringing.

In addition to the specific examples of treating paraffin and benzene, cited above, I have also successfully treated lard, olive oil, kerosene, lubricating oil and others.

I find that the reaction during the time that the compound is being substituted is accelerated by heat, light and pressure and by controlling any or all of these conditions, the reaction may also be controlled accordingly.

The term halogen as used in the specification and claims is used to denote any of the four elements, fluorine, chlorine, bromine or iodine. While I find that sulphur dioxide with any of the halogens, and particularly with chlorine, serves to carry out my method, these gases are selected for their abundance in nature and their relative small expense and ease of handling as compared with selenium or tellurium oxides which have chemical properties similar to sulphur dioxide and which, I believe, may be substituted therefor.

By "hydrocarbon-containing compounds" in the specification and claims I mean not only pure hydrocarbons and mixtures thereof, but also hydrocarbon derivatives such as fatty acids, animal and vegetable fats and oils and mixtures thereof.

What I claim is:

1. The method of forming substitution products containing an atom selected from the group consisting of sulphur, selenium and tellurium, and oxygen and a halogen from hydrocarbon-containing compounds which comprises reacting said compounds with a mixture of a halogen and a dioxide of an element of the group consisting of sulphur, selenium and tellurium.

2. The method of forming substitution products containing sulphur, oxygen and chlorine from hydrocarbon-containing compounds which comprises reacting said compounds with a gaseous mixture of chlorine and sulphur dioxide.

3. The method of forming substitution products containing sulphur, oxygen and chlorine which comprises reacting a saturated hydrocarbon-containing compound with chlorine and sulphur dioxide.

4. The method of forming substitution products containing sulphur, oxygen and chlorine which comprises reacting a saturated aliphatic hydrocarbon with sulphur dioxide and chlorine.

5. The method of forming substitution products which comprises reacting a saturated aliphatic hydrocarbon with sulphur dioxide and chlorine to form a product containing sulphur, oxygen and chlorine and hydrolyzing the reaction product.

6. The method of forming substitution products from hydrocarbons which comprises reacting said compounds with a gaseous mixture of chlorine and sulphur dioxide, saponifying the resulting products and recovering therefrom a mixture containing an appreciable amount of the so-produced saponified materials.

7. The method of forming substitution products from fatty acids of the type obtained from animal and vegetable fats and oils which comprises reacting said compounds with a gaseous mixture of chlorine and sulphur dioxide, saponifying the resulting products and recovering therefrom a mixture containing an appreciable amount of the so-produced saponified materials.

8. The method of forming substitution products from animal and vegetable fats and oils which comprises reacting said compounds with a gaseous mixture of chlorine and sulphur dioxide, saponifying the resulting products and recovering therefrom a mixture containing an appreciable amount of the so-produced saponified materials.

9. The method of forming intermediates comprising substitution products containing oxygen, sulphur and chlorine from hydrocarbons which comprises passing simultaneously into a normally liquid aliphatic saturated hydrocarbon gaseous chlorine and sulphur dioxide, under the influence of light.

10. The method of forming substitution products from hydrocarbons which comprises passing simultaneously into a normally liquid aliphatic saturated hydrocarbon gaseous chlorine and sulphur dioxide, saponifying the resulting products which contain oxygen, sulphur and chlorine and recovering therefrom a mixture containing an appreciable amount of the so-produced saponified materials.

11. The method of forming substitution products from hydrocarbons which comprises reacting, under the influence of light, liquid saturated aliphatic hydrocarbons with a gaseous mixture of chlorine and sulphur dioxide, saponifying the resulting products and recovering therefrom a mixture containing an appreciable amount of the so-produced saponified materials.

12. The method of forming an intermediate comprising a substitution product containing oxygen, sulphur and chlorine from hydrocarbons which comprises rendering fluid a mixture of long chain saturated aliphatic hydrocarbons and reacting therewith said hydrocarbons a gaseous mixture of chlorine and sulphur dioxide.

13. The method of forming substitution products having detergent properties from hydrocarbons which comprises rendering fluid a mixture of long chain saturated aliphatic hydrocarbons and passing simultaneously into said hydrocarbons gaseous chlorine and sulphur dioxide, then saponifying the resulting products and separating therefrom a mixture containing an appreciable amount of the so-produced saponified materials.

14. The method of forming surface active substitution products from hydrocarbons which comprises rendering fluid a mixture of saturated aliphatic hydrocarbons falling in the range of molecular weight of the hydrocarbons present in kerosene, lubricating oil and paraffin wax, introducing into said hydrocarbons in the presence of light a gaseous mixture of chlorine and sulphur dioxide, saponifying the resulting products and obtaining therefrom a mixture consisting substantially of the so-produced saponified materials.

15. Products obtained in accordance with the method described in claim 1.

16. Products obtained in accordance with the method described in claim 2.

17. Products obtained in accordance with the method described in claim 6.

18. Products obtained in accordance with the method described in claim 7.

19. Products obtained in accordance with the method described in claim 8.

20. Products obtained in accordance with the method described in claim 9.

21. Products obtained in accordance with the method described in claim 10.

22. Products obtained in accordance with the method described in claim 11.

23. Products obtained in accordance with the method described in claim 12.

24. Products obtained in accordance with the method described in claim 13.

25. Products obtained in accordance with the method described in claim 14.

26. The method of forming surface active substitution products from hydrocarbons which comprises reacting a non-gaseous saturated aliphatic hydrocarbon in the liquid state simultaneously with chlorine and sulphur dioxide, and hydrolyzing the resulting products with an aqueous liquid.

27. Products obtained in accordance with the process of claim 26.

28. The method of forming surface active substitution products from hydrocarbons which comprises reacting a non-gaseous saturated aliphatic hydrocarbon in the liquid state simultaneously with gaseous chlorine and gaseous sulphur dioxide, and hydrolyzing the resulting products with an aqueous alkaline liquid.

29. The products obtained in accordance with the method described in claim 28.

CORTES F. REED.